(No Model.)
J. A. ENO.
Trunk Catch.
No. 235,757.
Patented Dec. 21, 1880.
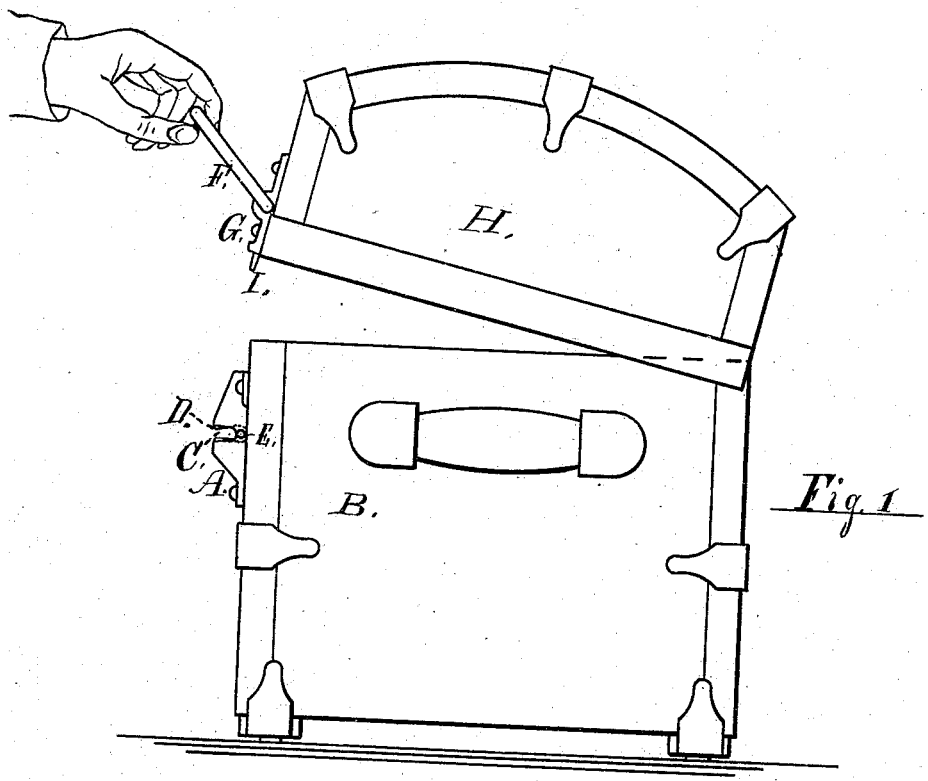
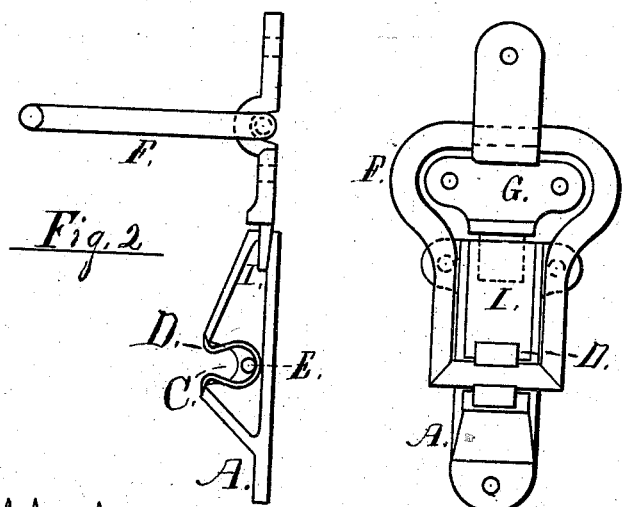
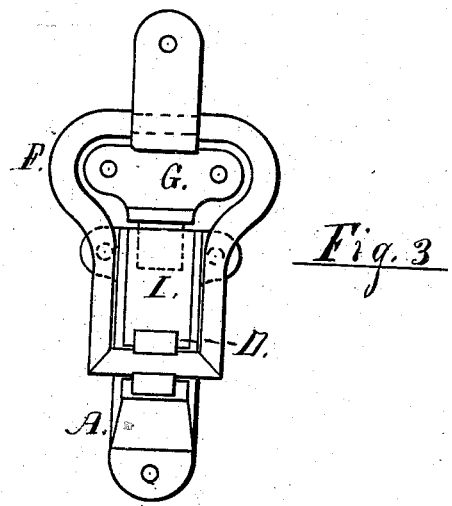
Attest.
John J. Ghegan
Charles M Knapp
Inventor.
Joseph A. Eno
By Horace Harris Atty

UNITED STATES PATENT OFFICE.

JOSEPH A. ENO, OF NEWARK, NEW JERSEY, ASSIGNOR TO IRA W. CON-
SELYEA, OF SAME PLACE.

TRUNK-CATCH.

SPECIFICATION forming part of Letters Patent No. 235,757, dated December 21, 1880.

Application filed May 28, 1880. (No model.)

*To all whom it may concern:*

Be it known that I, JOSEPH A. ENO, of Newark, in the county of Essex and State of New Jersey, have invented a new and useful Improvement in Trunk-Catches, of which the following is a specification.

My invention relates to trunk-catches, and combines a locking device to hold down the lid, and the loop portion acting as a handle or lifter to raise the lid when disengaged; and it consists in a loop attached to the lid and made to slip into a recess in a plate attached to the trunk-body, having within it one or more engaging-springs.

Figure 1 is an end view of a trunk having my attachment, and showing the lid partly raised. Fig. 2 shows the lid shut down and the loop raised out of lock. Fig. 3 is a front elevation, showing the catch in a locked position.

A is a plate attached to a trunk-body, B, having in its face a recess, C, and in the recess I place a sheet-metal spring-clamp, D, bent in a circular form, with a small opening at the ends, which ends branch outwardly to admit of the entrance of the loop; and this spring is held in position by a pin, E, passing across its inner face, or by some other suitable device.

F is a swing-loop hanging in the plate G, attached to the lid H, and made, when the lid is shut down, to have the lower end press into the recess between the ends of the spring.

A dowel-pin, I, being a part of the plate G, is made to fit in a recess in the top of the plate A, to hold the lid firmly in position when closed.

In some instances the lower half of the spring D may be dispensed with; but usually I prefer the two, as making a better fastening for the loop, leaving it not so liable to be disengaged by accident.

When the lid is to be raised the hands of the operator may be used together on the respective loops, the thumb and fingers of each hand forcing the lower portion of said loops forward out of engagement with the springs, and, retaining hold on the loops, raise the lid.

I have in these devices a simple and complete locking-catch, which combines also a lid-lifting feature.

I claim—

The loop F, hung in the plate G, in combination with the plate A, having the recess C and spring D, substantially as and for the purposes set forth.

JOSEPH A. ENO.

Witnesses:
 HORACE HARRIS,
 JOHN J. GHEGAN.